May 9, 1950            W. C. HALL            2,506,589
APPARATUS FOR THE DETECTION OF DISPLACEMENTS
Filed Oct. 31, 1945
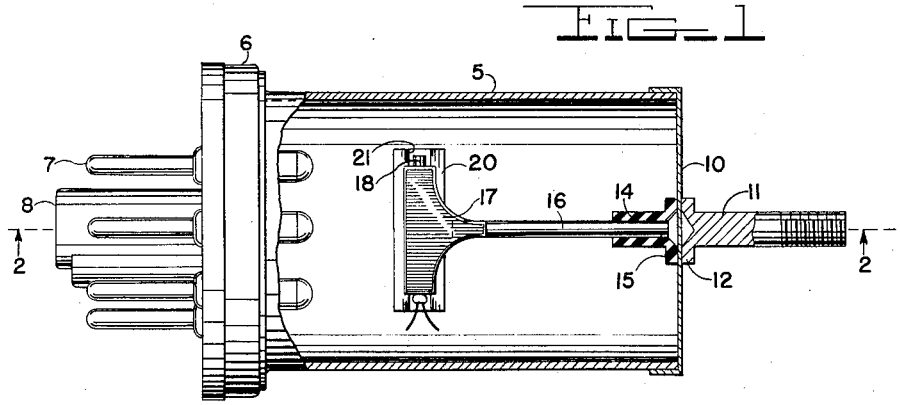
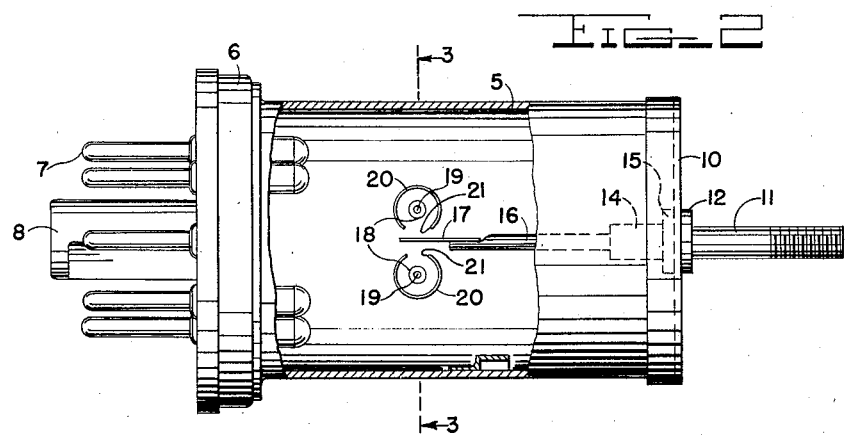
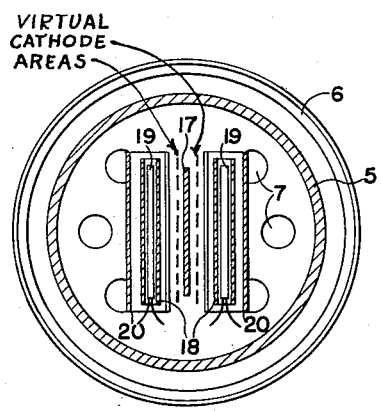
WAYNE C. HALL, Inventor
By Ralph L. Chappell, Attorney Patented May 9, 1950

2,506,589

UNITED STATES PATENT OFFICE 2,506,589

APPARATUS FOR THE DETECTION OF DISPLACEMENTS

Wayne C. Hall, Cheverly, Md.

Application October 31, 1945, Serial No. 625,924

2 Claims. (Cl. 250—27.5)

(Granted under the act of March 3, 1883, as amended April 30, 1928; 370 O. G. 757)

This invention relates to an apparatus for detecting displacements, and more particularly to an electrical apparatus for instantaneously detecting and for measuring mechanical displacements.

In some cases it is not feasible to measure or to detect mechanical displacement by the use of ordinary mechanical devices, such as micrometers. This is particularly true where the displacement is of a very small order, or where the displacement occurs over a very short period of time, or both. For this reason, in some instances it has been found desirable to employ electrical apparatus for the detection of and the measurement of the displacement. One type of electrical apparatus for detecting mechanical displacement which has received wide usage comprises a space discharge device including at least a cathode, a movable anode, and means responsive to the displacement to be detected or measured for imparting movement to the anode. Any movement imparted to the anode results in a change in average internal resistance between the anode and cathode with attendant change in the space current through the space discharge device. By connecting the space discharge device in a proper circuit and providing suitable indicating or recording means, a displacement of any desired character or magnitude may be detected or measured. Such apparatus is capable of detecting or measuring high frequency periodic or nonperiodic mechanical displacements whose values closely approximate the wavelength of red light and by the employment of suitable auxiliary means is readily adaptable to detecting or measuring displacements of considerable values. Such apparatus has been employed for detecting or measuring mechanical or elastic vibrations such as those occurring in bridges, buildings, various machinery and other structures; for detecting or recording earthquakes, either natural or such as are produced incidentally to geo-physical exploration; for detecting or measuring elastic deformation such, for example, as would occur in a ship's structure or a propeller shaft; for detecting or measuring angular displacement; and for detecting or measuring instantaneous liquid or gaseous pressure.

It will readily be apparent from the foregoing enumeration of the uses to which such apparatus may be put that the displacement being detected or measured or both, being usually of a very small order, must be detected or measured by apparatus having the highest degree of accuracy. Yet, in such electronic mechanical displacement measuring or detecting apparatus as has been heretofore available, the highest possible accuracy has not been realized due to the inherent characteristics of the electron discharge devices heretofore employed.

It is well known in the vacuum tube art that with a given plate potential the space current varies in a non-linear manner with the electrode spacing and increases rapidly as the spacing between the anode and cathode structure is reduced. This fact was first established by Child and is known as Child's law. Thus it has been thought that the average internal resistance between the anode and the cathode is a definite and reproducible function of the actual spacing between these electrodes; actually such is not the case where directly or indirectly heated cathodes are employed. The reason for this lies in the nature of the thermionic electron emission from the cathode of the space discharge device. When the cathode is heated, either directly or indirectly, thermionic emission of electrons occurs producing an electron cloud in the area immediately adjacent the cathode's emitting surface. To a large degree both the density and the size of this electron cloud are determined by the emission characteristics of the cathode and may vary not only among cathodes of different tubes but also may vary from time to time in the cathode of a given tube. Thus, in practice the effective spacing between the anode and the electron emitting surface of a heated cathode is the spacing between the anode and the electron cloud surrounding the cathode. Consequently, for accurate measurement, it becomes necessary to predetermine the location of the electron cloud, sometimes referred to as "the virtual cathode."

An object of the present invention is to provide a new and improved apparatus for detecting displacements, and more particularly for instantaneously detecting and for measuring mechanical displacements.

A further object of the present invention is to provide a space discharge device for use in an apparatus for detecting or measuring mechanical displacements in which the effective spacing between the anode and the cathode may be precisely predetermined.

A further object of the present invention is to provide a space discharge device for use in an apparatus for detecting or measuring mechanical displacements in which the emission from the virtual cathode may be stabilized.

In accordance with one embodiment of this invention, a space discharge device may be provided including at least a cathode, a movable anode, and means responsive to the displacement to be detected or measured for imparting movement to the anode. A grid, to which a controllable bias may be applied, is so located adjacent the cathode that the electrons emitted from the cathode may be concentrated at a predetermined point. The grid both stabilizes the electron emission and predetermines the location of the virtual cathode with respect to the anode.

Other objects and advantages of the present invention will be apparent from the following detailed description taken in conjunction with the drawings, wherein:

Fig. 1 is a longitudinal, sectional view, partly in elevation, of a space discharge device for measuring mechanical displacements constructed in accordance with one embodiment of this invention;

Fig. 2 is a longitudinal, sectional view, partly in elevation, taken substantially along the line 2—2 of Fig. 1; and Fig. 3 is a vertical, sectional view, taken along the line 3—3 of Fig. 2.

Referring now to the drawings, it will be seen that the space discharge device of this invention comprises a cylindrical envelope 5 which is rigidly mounted on a disc-shaped base 6, having a number of terminal pins 7 associated therewith. A keying member 8 extends to the left, as viewed in Figs. 1 and 2, from the center of the base 6 and serves to correctly position the terminals pins when the device is placed in a suitable socket, not shown. A flexible end plate or diaphragm 10 is secured to the opposite end of the envelope 5 from that to which the base 6 is secured and has fixed to the center of the outer side thereof a short rod 11, the rod 11 having a flange 12 integrally formed with the left end thereof to facilitate mounting on the diaphragm 10. A short, thick walled tube 14, having a flange 15 integrally formed with the right end thereof, is secured to the inner side of the diaphragm 10 and extends to the left therefrom on an axis coaxial with the rod 11 and the axis of the cylindrical envelope 5. The tube 14 serves as a support for a second rod 16, the right portion of which is received therein and suitably affixed thereto and to the left end of which is fixed an anode plate 17, the anode plate 17 being thus located on the axis of the envelope 5, and when no force is applied to the outer end of the rod 11, being disposed midway between a pair of indirectly heated, tubular cathodes 18. By forming the tube 14 of electrically insulating material, the anode 17 may be insulated from the envelope 5, if desired. A pair of rod shaped, heater elements 19 are associated with the cathodes 18 and, as may be seen in Fig. 2, are coaxially located with respect thereto. The cathodes and assoiated heated elements are suitably connected to the terminal pins 7 by lead wires, not shown, as is well known in the art, to apply the required potential thereto. While indirectly heated cathodes have been shown, directly heated cathodes may, of course, be employed instead. However, directly heated cathodes are somewhat more difficult to heat in that where a pair of such cathodes are employed in a tube of the type shown, separate power supplies are required for each cathode in order to isolate the cathodes from each other. It will also be understood that instead of two cathodes a single cathode may be employed. However, the use of two cathodes provides push-pull output in the operation of this device and is highly desirable.

In the operation of this device a potential is provided between the anode 17 and cathodes 18 and the mechanical displacement to be measured or detected is applied to the outer end of the rod 11, at right angles to the axis thereof, causing the anode plate 17 to move with respect to the cathodes, moving away from one cathode and nearer the other cathode. This causes a change in the average internal resistance between the anode and the cathodes, the magnitude of which is dependent on the degree of displacement and thus affords both a measure of the magnitude of the displacement as well as a means for detecting the displacement. However, as hereinbefore pointed out, due to variations which occur from time to time in the emission of the cathodes and consequent variations in both the density and location of the electron cloud surrounding the cathodes, the effective spacing between the anode and the cathodes may vary accordingly. While this variation is slight and in many applications of no substantial consequence, where displacements of very slight magnitude are to be measured with high accuracy, these variations may seriously affect the accuracy of the measurement.

In accordance with the present invention in order to overcome these variations a grid 20 has been mounted around each cathode, being located coaxially thereof. As may be clearly seen in Fig. 2 the grids 20 are cylindrical in shape and are interrupted by a longitudinally extending aperture 21 adjacent the anode plate 17. The grids 20 may be connected to a suitable source of potential whereby a bias of controllable value is applied to the grids to control the electron emission of the cathodes. By positioning the grids as described, the electron emission from the cathodes is concentrated at a point, or perhaps more properly in an area adjacent but spaced from each side of the anode 17, and lying substantially on a transverse plane bisecting both cathodes. The concentration of emission in this area provides an increased space charge at these points thereby locating the "virtual cathode" at these points. While cylindrical grids have been shown, other grid structures may be employed, such as mesh or wound grids having suitable shapes and openings to concentrate the electrons at a predetermined point from each cathode.

In practice it has been found that a substantial reduction is effected in the variation in position of the "virtual cathode" by employing the present invention. Consequently, the emission is effectively stabilized and the accuracy of the device greatly increased. Furthermore, since an increased space charge is obtained, it is possible to use reduced heating of the cathode and yet to obtain a space charge equal to that heretofore obtained in space discharge devices not employing the present invention. Since heating increases the displacement of the parts of the tube and consequently tends to increase the error present, a reduction in heating reduces the errors present. Also the provision of the grids permits ready control of the sensitivity of the device; since these devices are often employed in bridge circuits, it will be apparent that control of the order of sensitivity of the device is highly desirable.

While but one embodiment of the present invention has been shown and described, it will be understood that many changes and modifications may be made therein without departing from the spirit or scope of the present invention.

The invention shown and described herein may

What is claimed is:

1. A mechanical movement detecting space discharge device comprising a pair of spaced elongated parallel cathodes, interrupted sector cylindrical grid means partially enclosing the cathodes, the interrupted sectors being in facing relationship and the gird means being operative to establish virtual cathodes positioned between the cathodes, and a movable anode positioned centrally between the cathodes in variably spaced relationship.

2. Apparatus for detecting mechanical displacement comprising an envelope, an elongated thermionic cathode therein, an anode positioned in current receiving relation to the cathode, a cylindrical grid coaxially surrounding the cathode and interrupted between the cathode and anode and operative to concentrate the cathode emission into a single virtual cathode between the cathode and anode, and movable means carried by the envelope for varying the spacing between the anode and the cathode and mechanically coupled to one of said electrodes.

WAYNE C. HALL.

REFERENCES CITED

The following references are of record in the file of this patent:

UNITED STATES PATENTS

| Number | Name | Date |
|---|---|---|
| 2,142,857 | McArthur | Jan. 3, 1939 |
| 2,155,419 | Gunn | Apr. 25, 1939 |
| 2,204,306 | Harris | June 11, 1940 |
| 2,399,420 | Ziebolz | Apr. 30, 1946 |